United States Patent
Dries et al.

(10) Patent No.: US 9,514,575 B2
(45) Date of Patent: Dec. 6, 2016

(54) IMAGE AND ANNOTATION DISPLAY

(75) Inventors: Sebastian Peter Michael Dries, Hamburg (DE); Fabian Wenzel, Hamburg (DE); Thomas Netsch, Hamburg (DE)

(73) Assignee: Koninklijke Philips N.V., Eindhoven (NL)

( * ) Notice: Subject to any disclaimer, the term of this patent is extended or adjusted under 35 U.S.C. 154(b) by 144 days.

(21) Appl. No.: 13/825,824

(22) PCT Filed: Sep. 23, 2011

(86) PCT No.: PCT/IB2011/054189
§ 371 (c)(1),
(2), (4) Date: Mar. 25, 2013

(87) PCT Pub. No.: WO2012/042449
PCT Pub. Date: Apr. 5, 2012

(65) Prior Publication Data
US 2013/0187911 A1    Jul. 25, 2013

(30) Foreign Application Priority Data
Sep. 30, 2010 (EP) .................................. 10183771

(51) Int. Cl.
*G06T 19/20* (2011.01)
*G06T 19/00* (2011.01)

(52) U.S. Cl.
CPC ............ *G06T 19/20* (2013.01); *G06T 19/00* (2013.01); *G06T 2219/004* (2013.01); *G06T 2219/008* (2013.01)

(58) Field of Classification Search
CPC ................................... G06T 19/00; G06T 19/20
(Continued)

(56) References Cited

U.S. PATENT DOCUMENTS

| | | |
|---|---|---|
| 5,297,241 A | 3/1994 | Hirr et al. |
| 5,454,371 A * | 10/1995 | Fenster et al. ................ 600/443 |

(Continued)

FOREIGN PATENT DOCUMENTS

| | | |
|---|---|---|
| JP | 2001195610 A | 7/2001 |
| WO | 2008061913 A1 | 5/2008 |
| WO | 2009001257 A2 | 12/2008 |

*Primary Examiner* — Devona Faulk
*Assistant Examiner* — Hai Tao Sun

(57) ABSTRACT

A system (100) for displaying a multi-dimensional image and an annotation located therein, the system comprising receiving means (110) for receiving: the multi-dimensional image, the annotation, and representation data associated with the annotation, the representation data being indicative of a preferred representation of the multi-dimensional image and the annotation located therein; display means (130) for displaying an initial representation (300) of the multi-dimensional image and the annotation located therein; input means (120) for enabling a user to provide a visualization request when the initial representation shows at least a first part (310) of the annotation; and the display means (130) being arranged for, after receiving the visualization request, displaying the preferred representation (400) of the multi-dimensional image and the annotation located therein in accordance with the representation data, the preferred representation showing at least a second part (410) of the annotation, the second part being different from the first part.

30 Claims, 7 Drawing Sheets

(58) Field of Classification Search
USPC .......................................................... 345/419
See application file for complete search history.

(56) References Cited

U.S. PATENT DOCUMENTS

| | | | |
|---|---|---|---|
| 5,986,662 A * | 11/1999 | Argiro et al. | 345/424 |
| 6,978,230 B1 * | 12/2005 | Klosowski et al. | 703/7 |
| 2002/0070970 A1 * | 6/2002 | Wood et al. | 345/766 |
| 2004/0249271 A1 | 12/2004 | Besson et al. | |
| 2005/0228250 A1 * | 10/2005 | Bitter et al. | 600/407 |
| 2006/0215888 A1 | 9/2006 | Habets et al. | |
| 2006/0274928 A1 * | 12/2006 | Collins | A61B 6/00 382/132 |
| 2007/0242069 A1 * | 10/2007 | Matsue | G06F 19/321 345/428 |
| 2008/0009722 A1 | 1/2008 | Simopoulos et al. | |
| 2009/0080765 A1 * | 3/2009 | Bernard et al. | 382/154 |
| 2010/0195878 A1 * | 8/2010 | Vion et al. | 382/128 |

\* cited by examiner

IMAGE AND ANNOTATION DISPLAY

FIELD OF THE INVENTION

The invention relates to a system for, and a method of, displaying a multi-dimensional image and an annotation located therein.

BACKGROUND OF THE INVENTION

In the technical field of imaging, it is common practice to display an image while additionally displaying one or more annotations in or near the image. The annotation may be a symbol or a structure that is associated with a region or landmark within the image, and may take various forms, such as a line or point for spatially identifying the region, or text for providing information on the region. For example, in medical imaging, an image obtained by magnetic resonance imaging may have an annotation in the form of a circle displayed on top of the image that identifies an abnormally growing tissue region within the image.

The image may be, e.g., a three-dimensional image. An annotation in a three-dimensional image may be a one-dimensional annotation, i.e., a point, a two-dimensional annotation, e.g., a line or text, or a three-dimensional annotation, e.g., a volume. The annotation may be located in the image by means of a geometric reference to the image.

Various options exist to display the annotation in or near the multi-dimensional image. US 2006/0215888 A1 discloses a method of displaying a medical image with one or more additional symbols. The symbols may be used to, e.g., mark the edges of a volume. The method comprises rendering, with respect to a reference plane, three-dimensional volume data on a display, determining a distance between a region associated with the symbol and a picture element from the reference plane, scaling a size of the symbol according to said distance, and displaying the scaled symbol in or near the picture element.

SUMMARY OF THE INVENTION

It would be advantageous to have an improved system or method for displaying a multi-dimensional image and an annotation located therein.

To better address this concern, a first aspect of the invention provides a system for displaying a multi-dimensional image and an annotation located therein, the system comprising receiving means for receiving: the multi-dimensional image, the annotation, and representation data associated with the annotation, the representation data being indicative of a preferred representation of the multi-dimensional image and the annotation located therein, display means for displaying an initial representation of the multi-dimensional image and the annotation located therein, input means for enabling a user to provide a visualization request when the initial representation shows at least a first part of the annotation, and the display means being arranged for, after receiving the visualization request, displaying the preferred representation of the multi-dimensional image and the annotation located therein in accordance with the representation data, the preferred representation showing at least a second part of the annotation, the second part being different from the first part.

A multi-dimensional image may be represented in various ways. In particular, the representation may depend on the dimensionality of the image and on the display means used for displaying said image. For example, for representing a three-dimensional image on a two-dimensional display, such representations are usually two-dimensional representations, such as cross-sections or volume projections of the three-dimensional image. The representation may also depend on a user, as the user may select or adjust the representation according to his preferences or current activity.

Not all representations are equally suitable for displaying the annotation within the multi-dimensional image. For example, in a three-dimensional image, a cross-section of said image may not intersect the annotation, or may intersect the annotation at such a solid angle that the annotation is ill-represented or degenerated in the cross-section. Disadvantageously, a circular annotation may be represented in a particular cross-section as, e.g., a line, or just two points. Hence, the user may not be able to correctly identify the region associated with the annotation.

However, representations exist that are relatively well-suited for viewing the annotation and/or the region associated with the annotation. This may be the case if the representation fully shows the annotation as well as the region associated with the annotation. Also, if the annotation is created manually, the representation used by the annotator during the creation of the annotation is typically well-suited for displaying the annotation. Also, there may be a standardized representation that is well-suited for viewing the annotation. Said well-suited representation will henceforth be indicated as preferred representation.

The measures according to the invention have the effect that the system receives, in addition to the multi-dimensional image and the annotation, representation data that is indicative of a preferred representation of the multi-dimensional image. During operation, the system may display an initial representation of the multi-dimensional image in which a first part of the annotation is visible. Upon seeing the first part of the annotation, the user may then provide a visualization request to the system that triggers the preferred representation to be displayed, the preferred representation showing at least a second part of the annotation.

Accordingly, the user can easily switch from an arbitrary, i.e., initial, representation to the preferred representation to obtain a better representation of the annotation and/or region. Advantageously, the user is assisted in obtaining the preferred representation of the annotation, without having to manually adjust the representation. Advantageously, errors in the interpretation of the annotation may be prevented or reduced.

The multi-dimensional image may be a three-dimensional image, and the display means may be arranged for displaying as the initial representation of the three-dimensional image and the annotation located therein, an initial cross-section of said image, and for displaying as the preferred representation of the three-dimensional image and the annotation located therein, a preferred cross-section of said image, the preferred cross-section being different from the initial cross-section.

A cross-section is well-suited for representing a three-dimensional image on a two-dimensional display. Therefore, the display means may be arranged for displaying an initial cross-section of the three-dimensional image and the annotation located therein, and, upon receiving a visualization request from the user, for displaying a preferred cross-section of said image and said annotation.

The annotation may be located in a plane within the three-dimensional image, and the initial cross-section of the three-dimensional image may intersect the plane and the annotation located therein, and the preferred cross-section of the three-dimensional image may coincide with the plane and the annotation located therein If the annotation is located in a plane within the three-dimensional image, a cross-section is well-suited for displaying the annotation if the cross-section coincides with the plane and the annotation located therein. Hence, the display means may be arranged for displaying as the preferred cross-section a cross-section coinciding with said plane and the annotation located therein. Advantageously, a user may easily switch from a cross-section of the three-dimensional image that only partially shows the annotation and its associated region to one that fully shows the annotation and said region.

The multi-dimensional image may be a four-dimensional image comprising a plurality of time-dependent three-dimensional images, and the display means may be arranged for displaying as the initial representation of the four-dimensional image and the annotation located therein a cross-section of an initial one of the plurality of time-dependent three-dimensional images, and for displaying as the preferred representation of the four-dimensional image and the annotation located therein a cross-section of a preferred one of the plurality of time-dependent three-dimensional images, the preferred one being different from the initial one.

A four-dimensional image may comprise a time series of three-dimensional images, with the display means being arranged for initially displaying a cross-section of one of the three-dimensional images, i.e., corresponding to a first time instance. After receiving a visualization request, the display means then displays a cross-section of another one of the three-dimensional images, i.e., corresponding to a second time instance. Advantageously, a user may easily switch from a representation showing the annotation and its associated region at a first time instance to a representation showing the annotation and its associated region at a second time instance.

The system may further comprise an annotation generation means for enabling the user to generate the annotation using the preferred representation of the multi-dimensional image, the annotation generation means being arranged for generating the representation data in dependence on the preferred representation.

The annotation generation means allows the user to generate the annotation using the preferred representation. Also, the annotation generation means generates the representation data that is indicative of the preferred representation. Hence, the receiving means may obtain the annotation and the representation data from the annotation generation means. Consequently, the system enables the user to generate and to display the annotation, using a common representation of the multi-dimensional image. Advantageously, the annotation and/or representation data may be provided to another system for displaying the annotation, using the preferred representation.

The second part of the annotation shown in the preferred representation may be larger than the first part of the annotation shown in the initial representation.

By displaying a larger part of the annotation, a user is provided with an improved view of the annotation and, typically, of its associated region. An improved view aids in the interpretation of the annotation. Advantageously, errors in the interpretation of the annotation may be prevented or reduced.

The second part may encompass the annotation, and the first part may be a subset of the annotation.

By displaying the annotation in its entirety instead of only a subset of the annotation, a user is provided with an improved view of the annotation and, typically, of its associated region. An improved view aids in the interpretation of the annotation.

The input means may be a pointing device enabling the user to provide the visualization request by pointing to the annotation or by clicking on the annotation.

A pointing device, such as a mouse, touchpad, touchscreen or pointing stick provides a convenient and intuitive way of providing the visualization request. The pointing device enables the user to provide the visualization request by, e.g., pointing to the annotation or by clicking on the annotation.

The display means may be arranged for displaying the initial representation of the multi-dimensional image and the annotation located therein in a first window, and for displaying the preferred representation of the multi-dimensional image and the annotation located therein in a second window, the second window being located on top of, or alongside, the first window.

By showing the preferred representation on top of, or alongside, the initial representation, the user is provided with a simultaneous display of both representations. A simultaneous display may aid the user in interpreting the annotation by showing the annotation from two viewpoints. A simultaneous display may also prevent difficulties in interpretation due to, e.g., an otherwise sudden switch between both representations.

The display means may be arranged for displaying the initial representation of the multi-dimensional image and the annotation located therein, using a display setting, and after receiving the visualization request, for displaying the preferred representation of the multi-dimensional image and the annotation located therein, using the same display setting.

A particular display setting may be used for displaying the initial representation. The display setting may have been selected as a well-suited display setting by, e.g., the user or the system. The display setting may also be well-suited for the preferred representation, since both representations show the annotation and thus show related portions of the three-dimensional image. The display means is therefore arranged for using the same display setting for displaying the preferred representation.

The display setting may be indicative of a display contrast of the initial representation of the multi-dimensional image and the annotation located therein.

A user may have selected a well-suited contrast setting for the initial representation. A contrast setting is particularly relevant in the interpretation of details within the multi-dimensional image. The selected contrast setting may also be well-suited for the preferred representation, since both representations show the annotation and thus show related portions of the three-dimensional image. The display means is therefore arranged for using the same contrast setting for displaying the preferred representation.

A workstation may comprise the system set forth.

An imaging apparatus may comprise the system set forth.

A method of displaying a multi-dimensional image and an annotation located therein may comprise receiving the multi-dimensional image, the annotation, and representation data associated with the annotation, the representation data being indicative of a preferred representation of the multi-dimensional image and the annotation located therein, displaying an initial representation of the multi-dimensional image and the annotation located therein, enabling a user to provide a visualization request when the initial representation shows at least a first part of the annotation, and after receiving the visualization request, displaying the preferred representation of the multi-dimensional image and the annotation located therein in accordance with the representation data, the preferred representation showing at least a second part of the annotation, the second part being different from the first part.

A computer program product may comprise instructions for causing a processor system to perform the method set forth.

The display means may be arranged for, after receiving the visualization request, replacing the initial representation of the three-dimensional image with the preferred representation of said image.

Replacing the initial representation of the three-dimensional image with the preferred representation of said image results in the preferred representation being displayed in a similar way as the initial representation, e.g., in a window of the same size and/or same position. Advantageously, the preferred representation may be presented larger than would have been possible with a simultaneous display of both representations.

It will be appreciated by those skilled in the art that two or more of the above-mentioned embodiments, implementations, and/or aspects of the invention may be combined in any way deemed useful.

Modifications and variations of the image acquisition apparatus, the workstation, the method, and/or the computer program product, which correspond to the described modifications and variations of the system, can be carried out by a person skilled in the art on the basis of the present description.

The invention is defined in the independent claims. Advantageous embodiments are defined in the dependent claims.

A person skilled in the art will appreciate that the method may be applied to multi-dimensional image data, e.g. two-dimensional (2-D), three-dimensional (3-D) or four-dimensional (4-D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

BRIEF DESCRIPTION OF THE DRAWINGS

These and other aspects of the invention are apparent from and will be elucidated with reference to the embodiments described hereinafter. In the drawings.

DETAILED DESCRIPTION OF EMBODIMENTS

Figure 1:
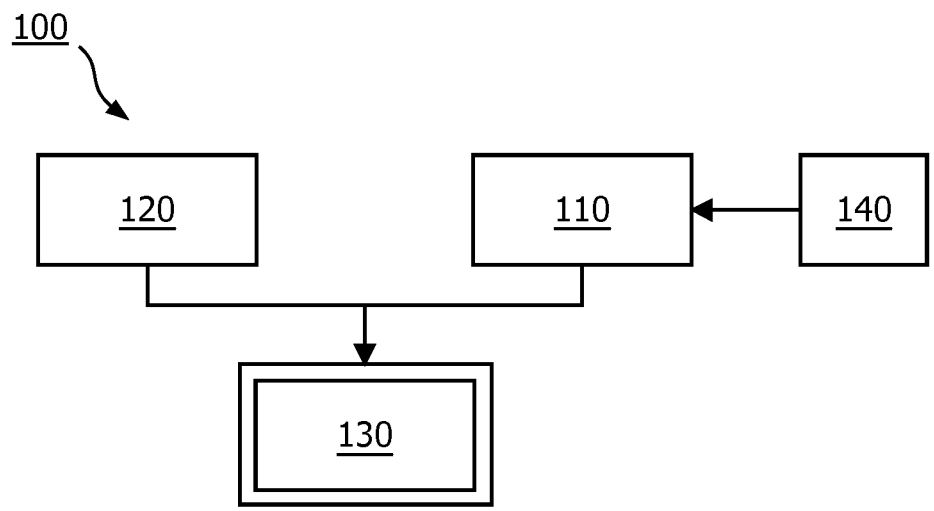
FIG. 1 shows a system for displaying a multi-dimensional image and an annotation located therein.

FIG. 1 shows a system 100 for displaying a multi-dimensional image and an annotation located therein. The system comprises a display means 130 for displaying an initial representation 300 of the multi-dimensional image and the annotation located therein. The display means 130 may, for example, comprise a computer monitor or a mobile display. The display means 130 may be arranged for two-dimensional display, or may be of a stereoscopic type for three-dimensional display. It will be appreciated that any suitable display means 130 may be used for displaying the initial representation.

Figure 3:
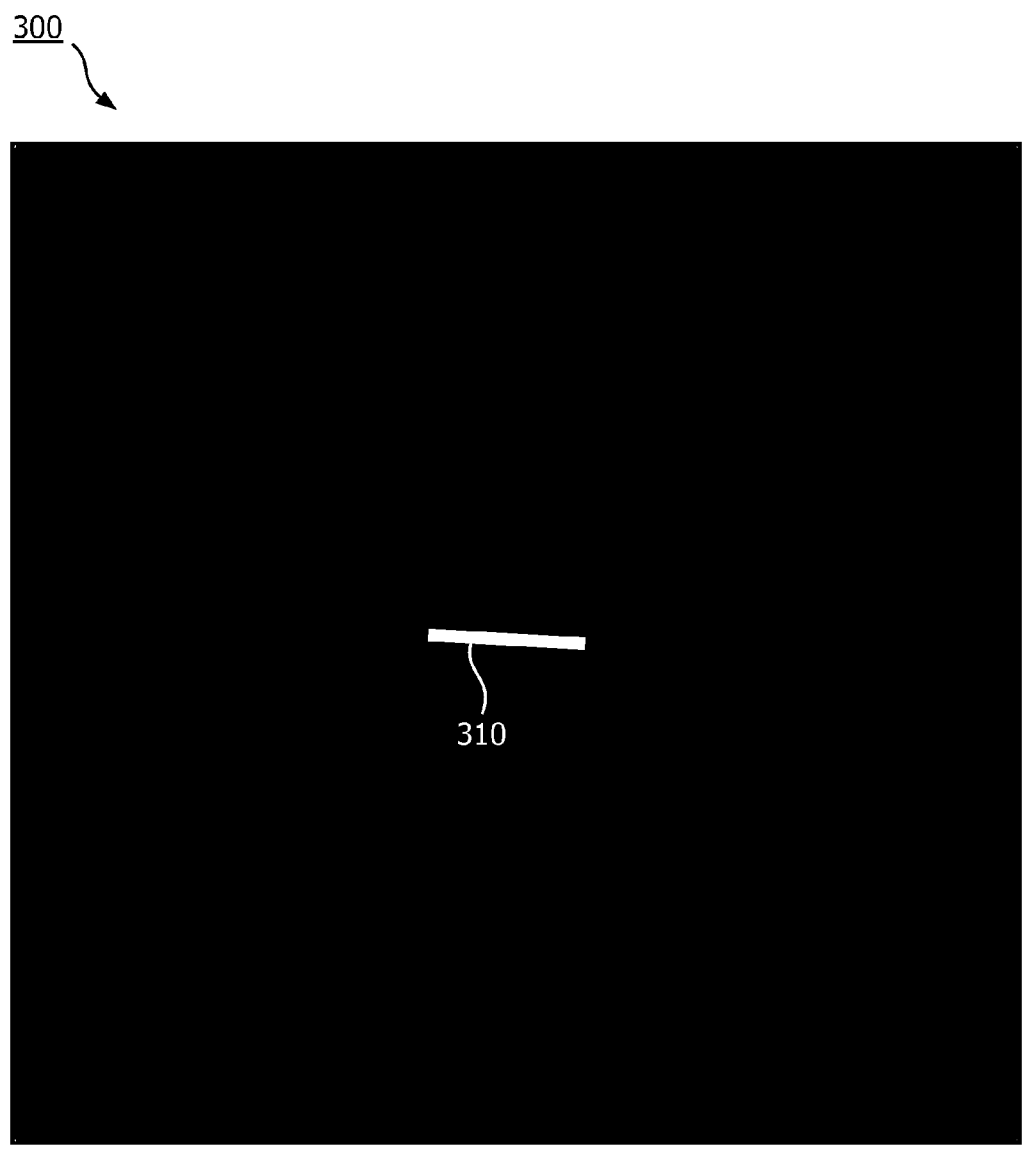
FIG. 3 shows an initial representation of a three-dimensional image.

An example of the initial representation 300 is shown in FIG. 3. Here, a cross-section of a three-dimensional image from the medical domain is shown. The three-dimensional image may have been obtained through, e.g., X-ray Imaging, Computed Tomography (CT), or any other suitable acquisition modality. Therefore, the initial representation 300 may show a cross-section of a human structure or a human tissue.

The display means 130 is arranged for showing, as part of the initial representation 300, the annotation within the multi-dimensional image. In FIG. 3, the three-dimensional image contains a two-dimensional annotation located in a plane within the three-dimensional image, and the cross-section is a cross-section that intersects the annotation. Thus, the initial representation 300 only shows a part of the annotation 310. This part of the annotation 310 is visible in the initial representation 300 as a line.

The system 100 further comprises an input means 120 for enabling a user to provide a visualization request when the initial representation 300 shows at least a part of the annotation. The input means 120 may be a pointing device. Hence, the display means 130 may be arranged for displaying a cursor 320 on top of the initial representation 300. The user may use the pointing device to provide a visualization request to the system 100. This may be done by hovering the cursor 320 near or on top of the annotation 310, as shown in FIG. 4, or by clicking on a dedicated element that is shown by the display means, like a button or menu.

The display means 130 is further arranged for, after receiving the visualization request, displaying a preferred representation 400 of the multi-dimensional image. An example of the preferred representation 400 is shown in FIG. 4 within a window that is overlaid on top of the initial representation 300. This manner of representation may be referred to as picture-in-picture. The window may be also accompanied by a description provided by, e.g., a text label as shown in FIG. 4. The description may have been created together with the annotation 410. It will be appreciated, however, that the preferred representation 400 may also be displayed in any other suitable manner, e.g., by showing the preferred representation 400 next to the initial representation 300.

Figure 4:
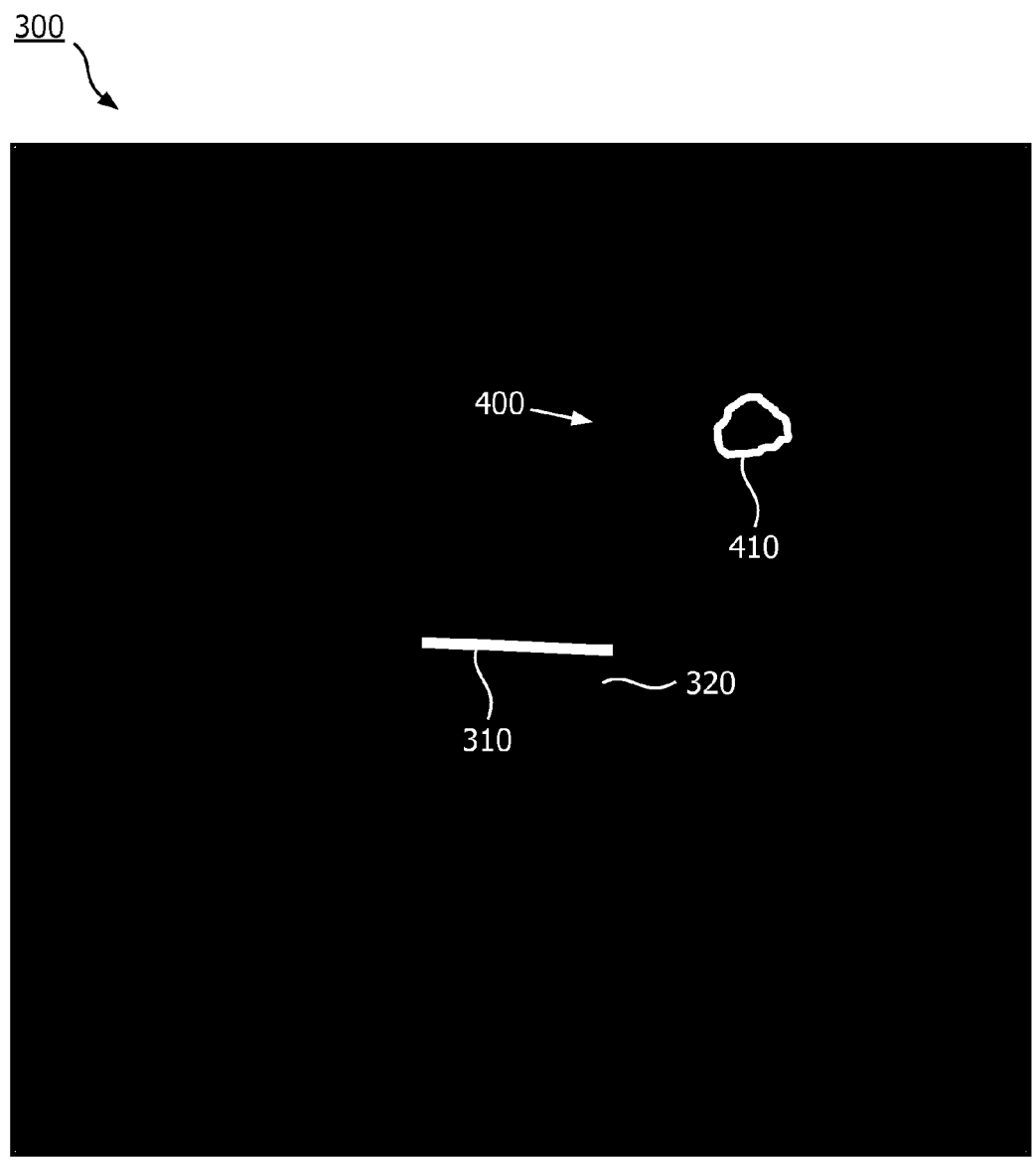
FIG. 4 shows a preferred representation of a three-dimensional image on top of an initial representation of the three-dimensional image.

The preferred representation 400 is shown in FIG. 4 as another cross-section of the three-dimensional image previously shown in FIG. 3. The cross-section provides a preferred, and thus alternative, view of the annotation 410 and the region associated with the annotation. In this example, the cross-section is chosen to coincide with the plane in which the annotation is located. Thus, the preferred representation 400 shows the entire annotation. A user is therefore able to determine that the annotation is circular and identifies a particular region. This information is lost in the initial representation 300 of FIG. 3. Consequently, the preferred representation 400 of FIG. 4 offers an improved view or perspective of the annotation and region associated with the annotation.

Figure 5:
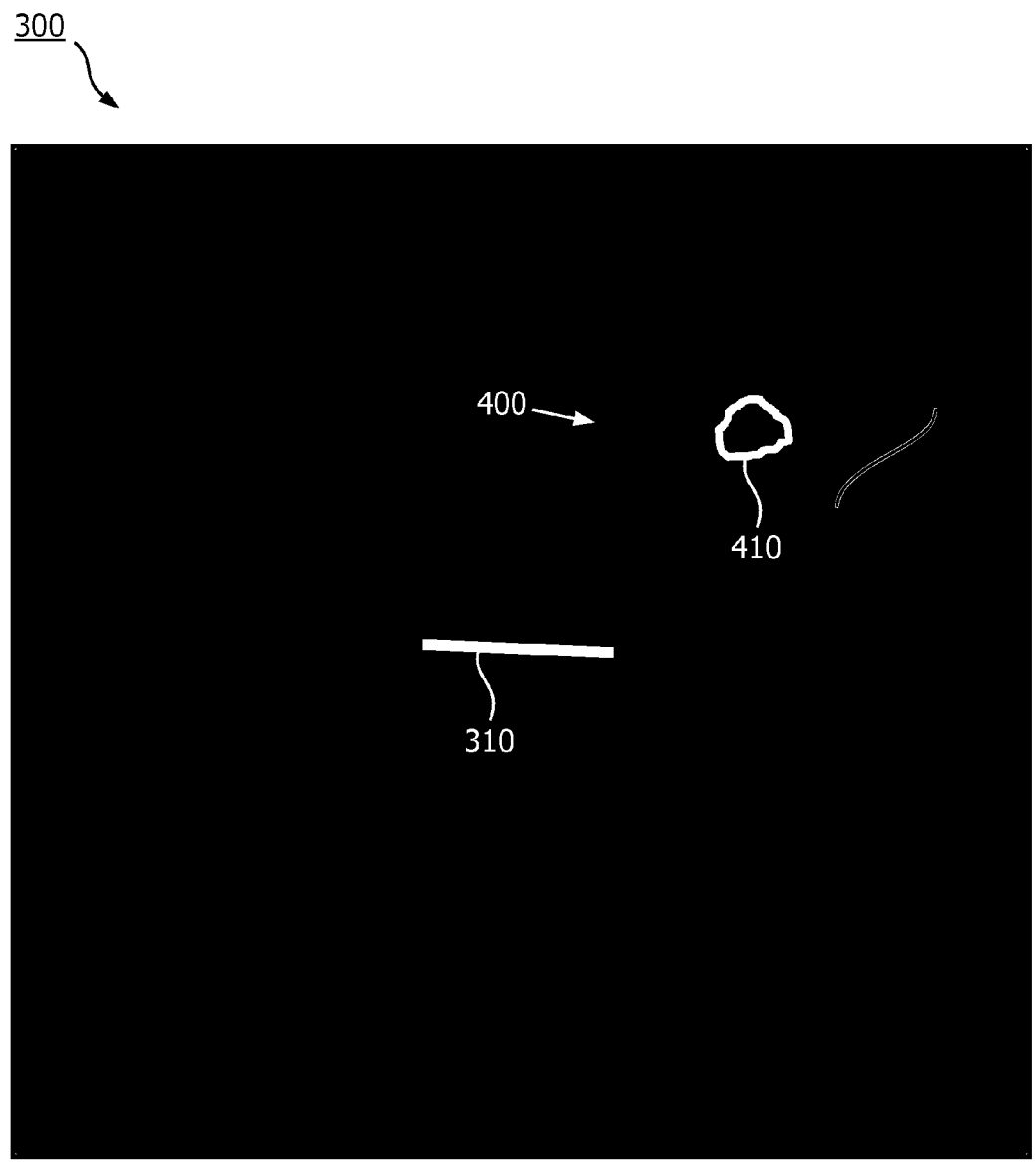
FIG. 5 shows a preferred representation of a three-dimensional image on top of an initial representation of the three-dimensional image, and a pointing device click action.
Figure 6:
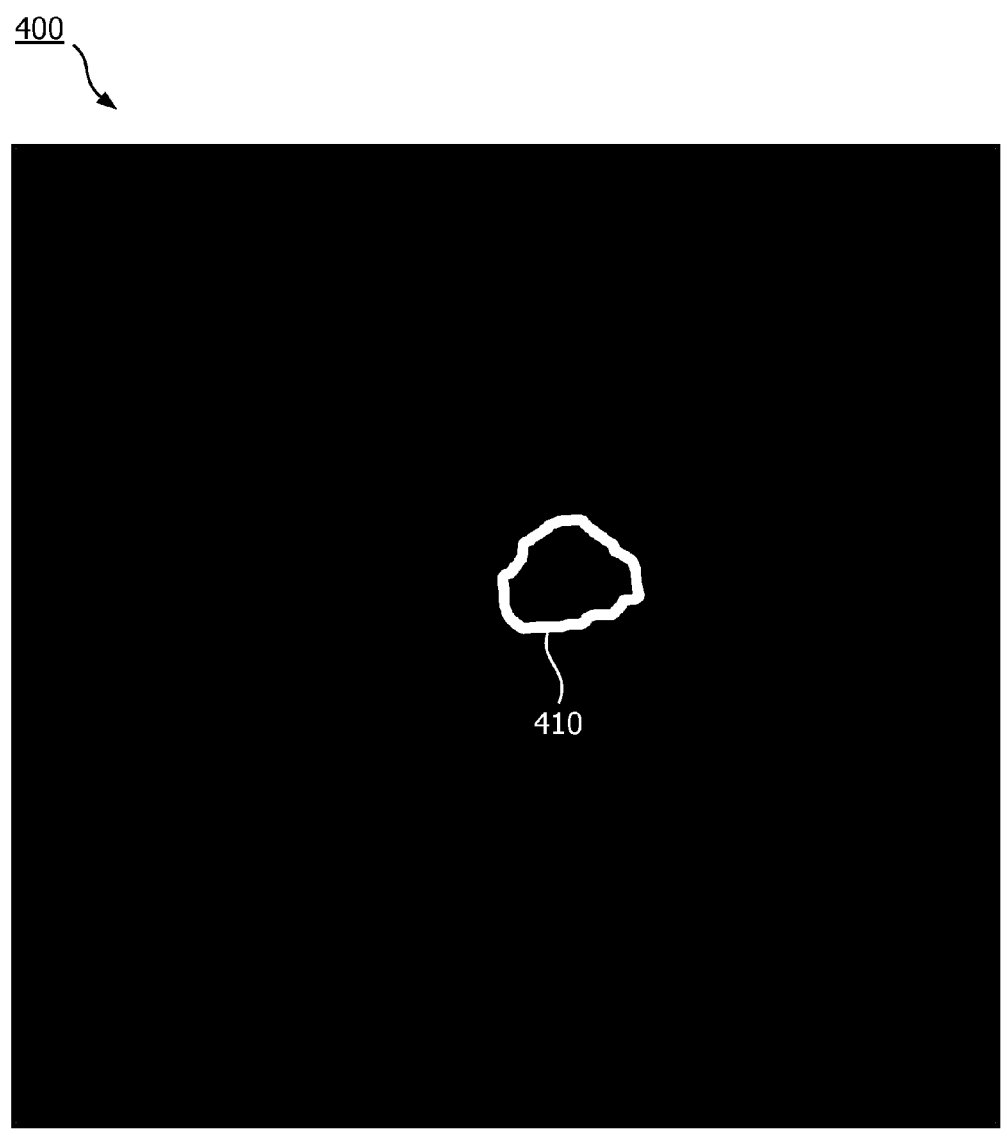
FIG. 6 shows a preferred representation of a three-dimensional image.

The input means 120 may also be arranged for enabling a user to click on the preferred representation 400. An example is shown in FIG. 5, where the cursor 330 is depicted during a clicking action performed by the user. The display means 130 may be arranged for, upon receiving the visualization request, replacing the initial representation 300 with the preferred representation 400, as is shown in FIG. 6. Consequently, the user is provided with a relatively large, e.g., full-screen, view of the preferred representation 400.

For receiving the multi-dimensional image and the annotation, the system 100 comprises a receiving means 110. The receiving means may be a computer file reader, memory reader, internet packet receiver, or any other suitable means for receiving said information. The receiving means 110 further receives representation data associated with the annotation. The representation data is used by the system 100 to determine the preferred representation 410 that is displayed upon receiving the visualization request. For that purpose, the representation data may comprise parameters relating to a plane equation for allowing the system to determine the preferred cross-section.

The system 100 may also be arranged for displaying an annotation in a four-dimensional image. The four-dimensional image may comprise a time series of three-dimensional images, i.e., a plurality of three-dimensional images, each of the plurality of three-dimensional images being associated with a particular instance in time. The four-dimensional image may have been obtained through, e.g., X-ray Imaging, Computed Tomography (CT), or any other suitable acquisition modality, by, e.g., capturing multiple three-dimensional images during a certain time interval.

Figure 7:
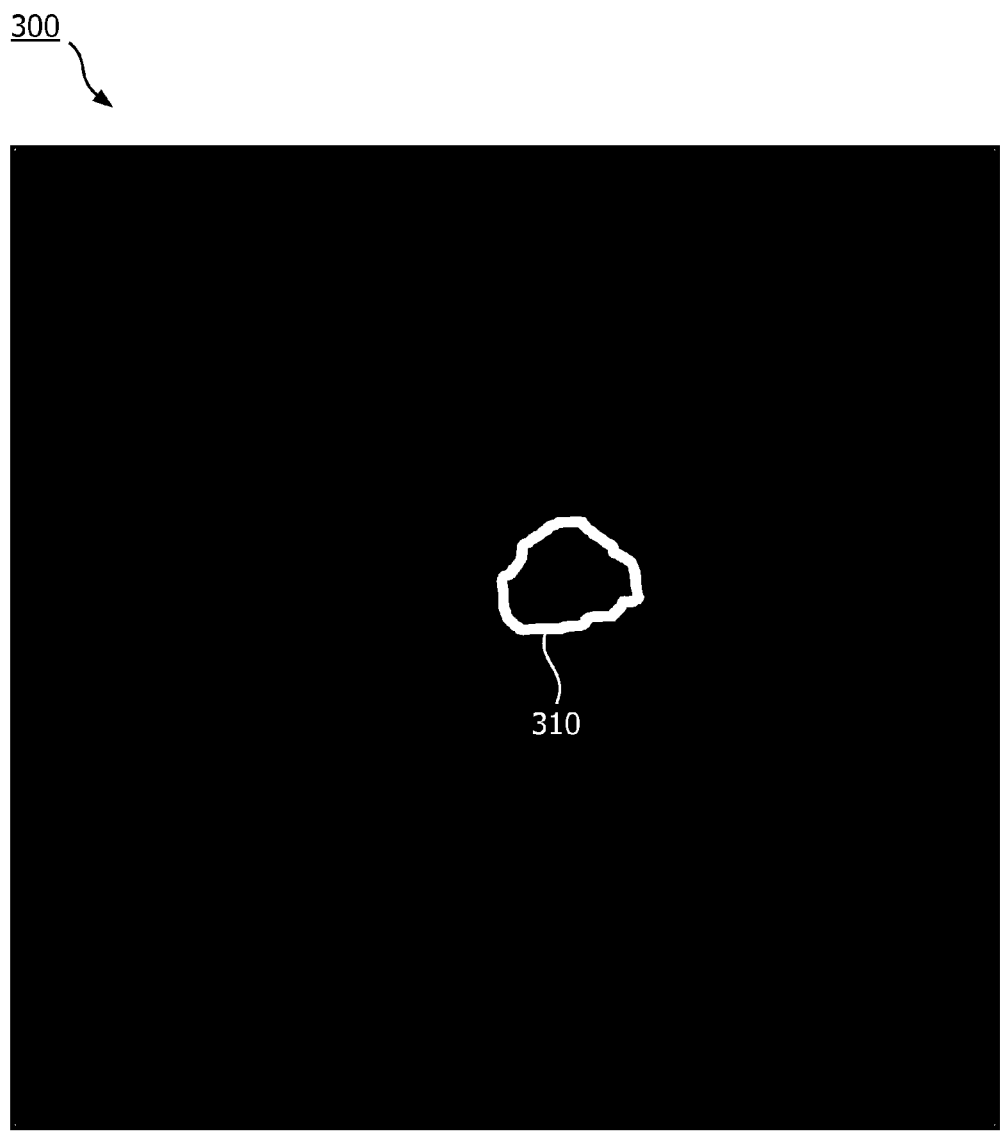
FIG. 7 shows an initial representation of a four-dimensional image at a first instance in time.

An example of an initial representation 300 of a four-dimensional image is shown in FIG. 7. Here, a cross-section of one of the plurality of three-dimensional images is shown. Thus, the cross-section corresponds to a particular instance in time. The display means 130 is arranged for showing, as part of the initial representation 300, an annotation 310. The display means may be arranged for displaying a cursor 320 on top of the initial representation 300. The user may use the pointing device to provide a visualization request to the system 100, for example, by clicking near or on top of the annotation 310.

Figure 8:
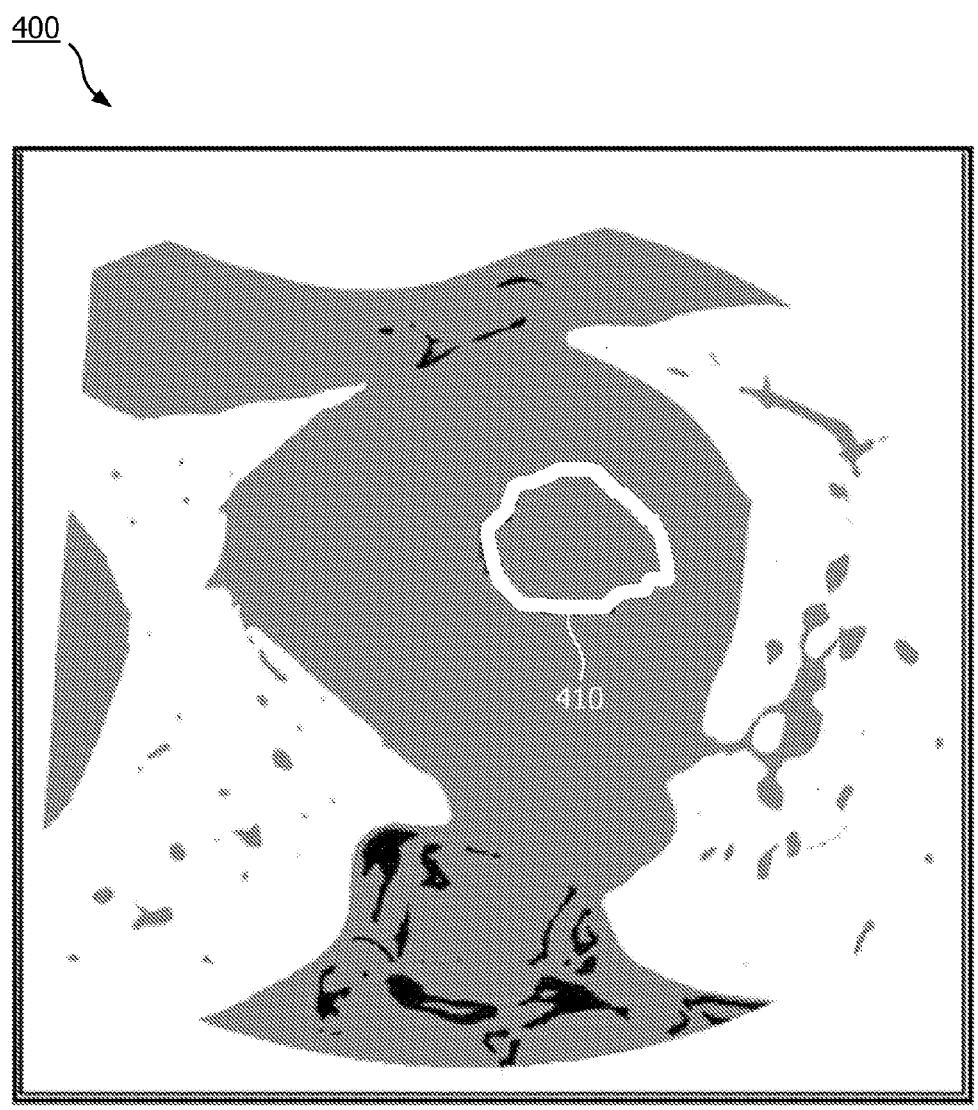
FIG. 8 shows a preferred representation of a four-dimensional image at a second instance in time.

After receiving the visualization request, the display means 130 displays a preferred representation 400 of the four-dimensional image. An example is shown in FIG. 8, where the preferred representation 400 is shown as a cross-section of another one of the plurality of three-dimensional images. Thus, the cross-section shown in FIG. 8 corresponds to another instance in time than the cross-section shown in FIG. 7.

The three-dimensional image shown in the initial representation 300 may differ from the three-dimensional image shown in the preferred representation 400. This may be due to, e.g., cell growth causing a change in form over time. For example, FIG. 7 may correspond to a cross-section of an earlier-acquired three-dimensional CT image, whereas FIG. 8 may correspond to a cross-section of a later-acquired three-dimensional CT image. Additionally, it may be that the cross-section plane changes between both representations, e.g., to adjust to a change in position of a particular cluster of growing cells.

The system 100 may optionally comprise an annotation generation means 140 for enabling the user to generate the annotation, using the preferred representation of the multi-dimensional image. The annotation generation means 140 may be a manual annotation generator to allow the user to manually draw, type or otherwise generate the annotation. For example, the annotation generation means 140 may comprise a pointing device for allowing the user to draw the annotation in the multi-dimensional image shown by the preferred representation. The annotation generation means 140 may also be a partially automatic annotation generator that, upon request of the user, automatically generates the annotation. For example, the annotation generation means 140 may comprise a known segmentation algorithm for segmenting a particular part of the multi-dimensional image shown in the preferred representation. The particular part may need to be approximately indicated by the user. The representation data may be generated by including data indicative of the preferred representation, such as, e.g., a plane equation of a preferred cross-section. Although not shown in FIG. 1, the system 100 may also comprise an output for outputting the generated annotation and representation data, e.g., onto a storage medium or computer network.

Figure 2:
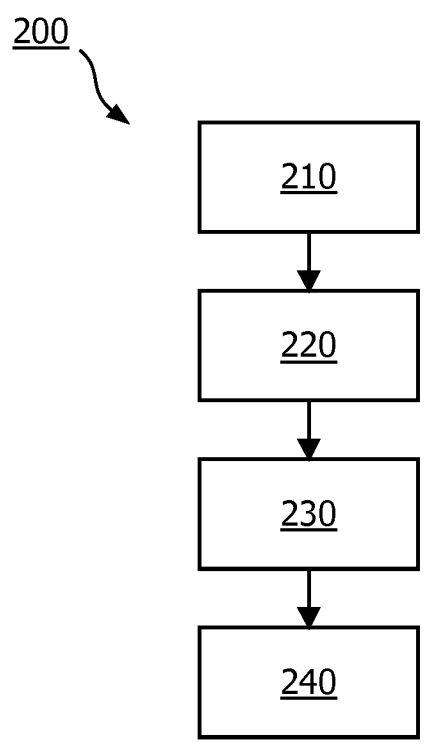
FIG. 2 shows a method of displaying a multi-dimensional image and an annotation located therein.

FIG. 2 shows a method 200 of displaying a multi-dimensional image and an annotation located therein. The method is similar to the system 100 shown in FIG. 1, in that the method comprises receiving 210 the multi-dimensional image, the annotation, and representation data associated with the annotation, the representation data being indicative of a preferred representation of the multi-dimensional image and the annotation located therein, displaying 220 an initial representation of the multi-dimensional image and the annotation located therein, enabling 230 a user to provide a visualization request when the initial representation shows at least a first part of the annotation; and after receiving the visualization request, displaying 240 the preferred representation of the multi-dimensional image and the annotation located therein in accordance with the representation data, the preferred representation showing at least a second part of the annotation, the second part being different from the first part.

It will be appreciated that the multi-dimensional image may be of any suitable dimensionality, e.g., two-, three-, or four-dimensional. The multi-dimensional image may originate from a plurality of images having originally a lower dimensionality, which are combined together to form the multi-dimensional image. For example, a three-dimensional image may be formed by a stack of originally two-dimensional images, a four-dimensional image may be formed by a series of originally three-dimensional images, and a five-dimensional image may be formed by a matrix of originally three-dimensional images.

The combination may not be explicitly reflected in a data structure of the multi-dimensional image. For example, it may be that the system internally uses a plurality of two-dimensional images, and that only in the user's interaction with the system the image appears to be three-dimensional to the user. This may be achieved by, e.g., allowing the user to navigate through a plurality of two-dimensional images as if the user were navigating through slices of a three-dimensional image.

The annotation located in the multi-dimensional image may be of any suitable dimensionality, e.g., one-, two-, three-, or four-dimensional. The dimensionality of the annotation may be equal to or less than that of the multi-dimensional image. For example, the annotation may be a two-dimensional annotation within a three-dimensional image, or a three-dimensional annotation within a four-dimensional image. The annotation may comprise two-dimensional geometric primitives, e.g., points, lines, contours, etc.

A specific example of an annotation is an ellipse through the largest section plane of a tumor in a three-dimensional image. Another specific example is a collection of lines to measure bone alignment, the lines being pre-defined by a measurement scheme. Yet another specific example is a collection of marked points in a three-dimensional image that denotes multiple sclerosis lesions. The annotations may have been drawn by expert users, and may serve the purpose of educating other users.

The initial representation 300 and/or the preferred representation 400 may be a cross-section, a volume projection, a volumetric representation or any other suitable manner of representing the multi-dimensional image. The representation may depend on the dimensionality of the image and on that of the display means. For example, for representing a three-dimensional image on a two-dimensional display, the representations may be a cross-section or a volume projection, whereas on a stereoscopic display, the representation may be a volumetric representation of the three-dimensional image.

When displaying the initial representation 300, the display means 130 may be arranged for displaying a hint that the initial representation 300 only shows a part of the annotation 310. For example, if the initial representation 300 is a cross section that intersects the annotation, the display means 130 may be arranged for displaying the intersected part of the annotation 310 as solid and thick, and for displaying a non-intersected part of the annotation in a transparent manner, the transparency being indicative of a geometric distance between the non-intersected part of the annotation and the cross-section. Also, the non-intersected part may be scaled in size to reflect said geometric distance.

The input means 120 may be any suitable input means that enables a user to provide a visualization request. Therefore, the input means 120 may comprise a pointing device, such as a computer mouse, touch screen, pointing stick, etc. The user may provide the visualization request by pointing, e.g., to the annotation or to a region associated with the visualization request. The input means 120 may also comprise a keyboard, microphone or camera, for allowing the user to provide the visualization request by means of a key press, voice command or gesture, respectively. The system 100 may be arranged for providing feedback to the user, before or after receiving the visualization request. For example, the annotation may be visually highlighted when the user places a cursor over the annotation.

The multi-dimensional image, the annotation and the representation data may be received by the receiving means 110 as a single data structure or signal. The multi-dimensional image may also be received separately from the annotation and the representation data, with the annotation and the representation data providing separately received enhanced functionality. The representation data may be also received separately from the multi-dimensional image and the annotation for allowing said image and annotation to be also used in systems that cannot process the representation data.

The representation data may comprise parameters relating to a plane equation for allowing the system to determine a preferred cross-section. The representation data may also comprise parameters relating to a projection matrix for allowing the system to determine a preferred volume projection. Furthermore, when the multi-dimensional image comprises a number of lower-dimensional images, the representation data may comprise a parameter indicative of a particular one of the lower-dimensional images that shows the annotation.

The abovementioned system and method may be applied in a variety of imaging fields. For example, the multi-dimensional image may be an architectural model of, e.g., a building, with the annotations relating to particular elements of the building or its interior. Hence, an architect may use the system to display the architectural model and the annotations contained therein. Similarly, the multi-dimensional image may be, e.g., a technical model of a car, with the annotations relating to particular elements of the car.

It will be appreciated that the invention also applies to computer programs, particularly computer programs on or in a carrier, adapted to put the invention into practice. The program may be in the form of a source code, an object code, a code intermediate source and object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for displaying a multi-dimensional image and an annotation located therein, the system comprising:
   receiving means for receiving: the multi-dimensional image, the annotation, and representation data associated with the annotation, the representation data being indicative of a preferred and predetermined representation of the multi-dimensional image and the annotation located therein;
   display means for displaying an initial cross-section of an image as an initial representation of the multi-dimensional image and the annotation located therein;
   input means for enabling a user to provide a visualization request identifying the annotation when the initial representation shows at least a first part of the annotation; and
   the display means being arranged for, after receiving the visualization request identifying the annotation, identifying the representation data based upon its association with the identified annotation, displaying a preferred cross-section of an image as the preferred representation of the multi-dimensional image and the annotation located therein in accordance with the representation data, the preferred representation showing at least a second part of the annotation, the second part being different from the first part, and the preferred cross-section being different from the initial cross-section, wherein the representation data comprises parameters of a plane equation, parameters of a projection matrix, and a parameter indicative of a particular one of lower-dimensional images.

2. The system according to claim 1, wherein the multi-dimensional image is a three-dimensional image, and the initial cross-section and the preferred cross-section are cross-sections of said three-dimensional image.

3. The system according to claim 2, wherein the annotation is located in a plane within the three-dimensional image, and wherein
   the initial cross-section of the three-dimensional image intersects the plane and the annotation located therein; and
   the preferred cross-section of the three-dimensional image coincides with the plane and the annotation located therein.

4. The system according to claim 1, wherein the multi-dimensional image is a four-dimensional image comprising a plurality of time-dependent three-dimensional images, the initial cross-section is a cross-section of an initial one of the plurality of time-dependent three-dimensional images; and
   the preferred cross-section is a cross-section of a preferred one of the plurality of time-dependent three-dimensional images.

5. The system according to claim 1, the system further comprising an annotation generation means for enabling the user to generate the annotation, using the preferred representation of the multi-dimensional image, the annotation generation means being arranged for generating the representation data in dependence on the preferred representation.

6. The system according to claim 1, wherein the second part of the annotation shown in the preferred representation is larger than the first part of the annotation shown in the initial representation.

7. The system according to claim 6, wherein the second part encompasses the annotation, and wherein the first part is a subset of the annotation.

8. The system according to claim 1, wherein the input means is a pointing device enabling the user to provide the visualization request by pointing to the annotation or by clicking on the annotation.

9. The system according to claim 1, wherein the display means is arranged for:
   displaying the initial representation of the multi-dimensional image and the annotation located therein in a first window; and
   displaying the preferred representation of the multi-dimensional image and the annotation located therein in a second window, the second window being located on top of, or alongside, the first window.

10. The system according to claim 1, wherein the display means is arranged for:
    displaying the initial representation of the multi-dimensional image and the annotation located therein, using a display setting; and
    after receiving the visualization request, displaying the preferred representation of the multi-dimensional image and the annotation located therein, using the same display setting.

11. The system according to claim 10, wherein the display setting is indicative of a display contrast of the initial representation of the multi-dimensional image and the annotation located therein.

12. A workstation comprising the system according to claim 1.

13. An imaging apparatus comprising the system according to claim 1.

14. A method of displaying a multi-dimensional image and an annotation located therein, the method comprising:
    receiving the multi-dimensional image, the annotation, and representation data associated with the annotation, the representation data being indicative of a preferred and predetermined representation of the multi-dimensional image and the annotation located therein;
    displaying an initial representation of the multi-dimensional image and the annotation located therein;
    enabling a user to provide a visualization request identifying the annotation when the initial representation shows at least a first part of the annotation; and
    after receiving the visualization request identifying the annotation, identifying the representation data based upon its association with the identified annotation, displaying a preferred cross-section of an image as the preferred representation of the multi-dimensional image and the annotation located therein in accordance with the representation data, the preferred representation showing at least a second part of the annotation, the second part being different from the first part, wherein the representation data comprises parameters of a plane equation, parameters of a projection matrix, and a parameter indicative of a particular one of lower-dimensional images.

15. A non-transitory computer-readable medium comprising instructions that when executed by a processor cause the processor to perform the method according to claim 14.

16. A system for displaying a multi-dimensional image and an annotation located therein, the system comprising:
   a receiver configured to receive the multi-dimensional image, the annotation, and representation data associated with the annotation, the representation data being indicative of a preferred and predetermined representation of the multi-dimensional image and the annotation located therein;
   a display configured to display an initial cross-section of an image as an initial representation of the multi-dimensional image and the annotation located therein; and
   an input through which a user provides a visualization request identifying the annotation when the initial representation shows at least a first part of the annotation;
   the display being configured to, after receiving the visualization request identifying the annotation, identify the representation data based upon its association with the identified annotation, display a preferred cross-section of an image as the preferred representation of the multi-dimensional image and the annotation located therein in accordance with the representation data, the preferred representation showing at least a second part of the annotation, the second part being different from the first part, and the preferred cross-section being different from the initial cross-section, wherein the representation data comprises parameters of a plane equation, parameters of a projection matrix, and a parameter indicative of a particular one of lower-dimensional images.

17. The system according to claim 16, wherein the multi-dimensional image is a three-dimensional image, and the initial cross-section and the preferred cross-section are cross-sections of said three-dimensional image.

18. The system according to claim 17, wherein the annotation is located in a plane within the three-dimensional image, and wherein
   the initial cross-section of the three-dimensional image intersects the plane and the annotation located therein; and
   the preferred cross-section of the three-dimensional image coincides with the plane and the annotation located therein.

19. The system according to claim 16, wherein the multi-dimensional image is a four-dimensional image comprising a plurality of time-dependent three-dimensional images, the initial cross-section is a cross-section of an initial one of the plurality of time-dependent three-dimensional images; and the preferred cross-section is a cross-section of a preferred one of the plurality of time-dependent three-dimensional images.

20. The system according to claim 16, further comprising:
   an annotation generator which allows the user to generate the annotation, using the preferred representation of the multi-dimensional image, the annotation generator being configured to generate the representation data in dependence on the preferred representation.

21. The system according to claim 16, wherein the second part of the annotation shown in the preferred representation is larger than the first part of the annotation shown in the initial representation.

22. The system according to claim 21, wherein the second part encompasses the annotation, and wherein the first part is a subset of the annotation.

23. The system according to claim 16, wherein the input is a pointing device enabling the user to provide the visualization request by pointing to the annotation or by clicking on the annotation.

24. The system according to claim 16, wherein the display is arranged for:
   displaying the initial representation of the multi-dimensional image and the annotation located therein in a first window; and
   displaying the preferred representation of the multi-dimensional image and the annotation located therein in a second window, the second window being located on top of, or alongside, the first window.

25. The system according to claim 16, wherein the display is arranged for:
   displaying the initial representation of the multi-dimensional image and the annotation located therein, using a display setting; and
   after receiving the visualization request, displaying the preferred representation of the multi-dimensional image and the annotation located therein, using the same display setting.

26. The system according to claim 25, wherein the display setting is indicative of a display contrast of the initial representation of the multi-dimensional image and the annotation located therein.

27. A workstation comprising the system according to claim 16.

28. An imaging apparatus comprising the system according to claim 16.

29. The system of claim 1, wherein the representation data identifies the representation of the multi-dimensional image displayed to the user at the time the annotation was created.

30. The system of claim 1, wherein the representation data comprises parameters of a plane equation, parameters of a projection matrix, or a parameter indicative of a particular one of lower-dimensional images.

* * * * *